(12) United States Patent
Werkheiser et al.

(10) Patent No.: US 11,879,326 B2
(45) Date of Patent: Jan. 23, 2024

(54) MAGNETIC PERMEABILITY SENSOR FOR USING A SINGLE SENSOR TO DETECT MAGNETIC PERMEABLE OBJECTS AND THEIR DIRECTION

(71) Applicant: Halliburton Energy Services, Inc., Houston, TX (US)

(72) Inventors: Gregory Thomas Werkheiser, Carrollton, TX (US); Michael Linley Fripp, Carrollton, TX (US); Zachary William Walton, Flower Mound, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 127 days.

(21) Appl. No.: 17/123,370

(22) Filed: Dec. 16, 2020

(65) Prior Publication Data

US 2022/0186606 A1 Jun. 16, 2022

(51) Int. Cl.
*E21B 47/09* (2012.01)
*E21B 47/092* (2012.01)
*G01V 3/10* (2006.01)
*E21B 34/14* (2006.01)

(52) U.S. Cl.
CPC .............. *E21B 47/092* (2020.05); *G01V 3/10* (2013.01); *E21B 34/142* (2020.05); *E21B 2200/06* (2020.05)

(58) Field of Classification Search
CPC .. E21B 47/092; E21B 2200/06; E21B 34/142; G01V 3/10
See application file for complete search history.

(56) References Cited

U.S. PATENT DOCUMENTS

| 4,808,925 | A | * | 2/1989 | Baird | G01N 27/82 336/110 |
|---|---|---|---|---|---|
| 5,414,353 | A | | 5/1995 | Weischedel | |
| 5,473,244 | A | * | 12/1995 | Libove | G01R 15/142 324/130 |
| 9,284,817 | B2 | | 3/2016 | Walton et al. | |
| 9,506,324 | B2 | | 11/2016 | Kyle et al. | |
| 9,587,486 | B2 | | 3/2017 | Walton et al. | |
| 9,920,620 | B2 | | 3/2018 | Murphree et al. | |

(Continued)

OTHER PUBLICATIONS

"CA Application No. 3109001 Office Action", dated Feb. 25, 2022, 4 pages.

(Continued)

*Primary Examiner* — Christopher J Sebesta
(74) *Attorney, Agent, or Firm* — DeLizio, Peacock, Lewin & Guerra, LLP (57) ABSTRACT

Apparatus, methods, and systems are provided to count one or more magnetically permeable objects that have passed by a magnetic sensor and determine a direction thereof. The apparatus comprises a first permanent magnet; a second permanent magnet; a magnetic field sensor disposed between opposing poles of the first permanent magnet and the second permanent magnet; and a circuit connected to the magnetic field sensor, the circuit configured to count one or more magnetically permeable objects that have passed by the magnetic field sensor, and determine direction of the one or more magnetically permeable objects based on an output of the magnetic field sensor.

13 Claims, 9 Drawing Sheets

(56) References Cited

U.S. PATENT DOCUMENTS

| | | | |
|---|---|---|---|
| 10,221,653 B2 | 3/2019 | Walton et al. | |
| 10,364,637 B2 | 7/2019 | Walton et al. | |
| 2007/0240967 A1 | 10/2007 | Martin et al. | |
| 2011/0240311 A1 | 10/2011 | Robison et al. | |
| 2012/0118582 A1 | 5/2012 | Soni et al. | |
| 2013/0048290 A1 | 2/2013 | Howell et al. | |
| 2013/0056197 A1* | 3/2013 | Maida | E21B 47/135 |
| | | | 166/66.5 |
| 2013/0264051 A1* | 10/2013 | Kyle | E21B 23/00 |
| | | | 166/66.5 |
| 2016/0258260 A1* | 9/2016 | Walton | E21B 34/14 |
| 2017/0248009 A1* | 8/2017 | Fripp | E21B 47/13 |
| 2018/0023386 A1* | 1/2018 | Brown | E21B 47/092 |
| | | | 324/221 |
| 2018/0340396 A1 | 11/2018 | Cox et al. | |
| 2019/0249549 A1 | 8/2019 | Fripp et al. | |
| 2022/0065818 A1 | 3/2022 | Werkheiser et al. | |

OTHER PUBLICATIONS

"Elect Monobore Sleeve Systems", Halliburton Energy Services, Inc. Frac Sleeve Systems, 2019, 1 page.

"Innovative Elect Frac Sleeve System Proves Successful for Demanding Well Conditions", Halliburton Energy Services, Inc. Case Study, 2019, 2 pages.

PCT Application No. PCT/US2021/053813, International Search Report, dated Jan. 21, 2022, 4 pages.

PCT Application No. PCT/US2021/053813, Written Opinion, dated Jan. 21, 2022, 5 pages.

\* cited by examiner

MAGNETIC PERMEABILITY SENSOR FOR USING A SINGLE SENSOR TO DETECT MAGNETIC PERMEABLE OBJECTS AND THEIR DIRECTION

TECHNICAL FIELD

The disclosure generally relates to valve arrangements for boreholes (wellbores) or wells in wells.

BACKGROUND

In downhole well completions, it is sometimes necessary to actuate one or more downhole device without having direct hydraulic or electric communication with the downhole device. At times one or more balls are dropped or pumped into the wellbore to trigger actuation of the device. Some downhole devices trigger based on a count of balls that have passed one or more sensors. At times, balls pumped downhole reverse direction, e.g., due to pressure changes or due to the flow of one or more fluid, passing the one or more sensors a second time. This can result an incorrect count and therefore lead to the possibility of an early triggering of a downhole device.

BRIEF DESCRIPTION OF THE DRAWINGS

One or more embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to sliding sleeves and a baffle seat as examples of downhole devices. Aspects of this disclosure can also be applied to other downhole devices. In other instances, well-known instruction instances, protocols, structures, and techniques have not been shown in detail in order not to obfuscate the description.

As part of a completion, e.g., during a multi-zone hydraulic fracturing operation, there is often the need to actuate or activate one or more downhole devices, such as one or more sleeves, screens, valves, or even one or more sensors. At times this activation can occur once a certain number of objects, e.g., one or more balls, are dropped or pumped past a sensor. Circuitry coupled to the sensor can store a count of the objects that have passes the sensor and can trigger actuation of the downhole device when the appropriate count is reached. However, at times, the objects end up traveling back uphole past the same sensor, e.g., when a ball is pumped back up the tubing due to a screen-out or the like. If the sensor treats the object traveling uphole the same as an object traveling downhole, i.e., not accounting for the direction of travel, it is possible the sensor will miscount. A miscount can lead to premature activation, or actuation, of the downhole device, potentially damaging the well or at the very least contravening the completion plan.

As will be further explained below, configuring a single sensor in the downhole system to account for direction allows the circuitry to be configured to both update the count based on the direction, e.g., either ignoring the objects traveling uphole or decrementing the count when they travel uphole (this latter option is done because the objects often travel back downhole after going up, i.e., passing the sensor three times). By implementing a magnetic field sensor disposed between two opposing permanent magnets as the sensor, a single sensor can detect the direction of an object having a high magnetic permeability, allowing circuitry storing the count to be properly adjusted to maintain an accurate count. Further, the counting and direction is determined in a manner that is lower power can small enough in size to be easily deployed downhole.

Figure 1:
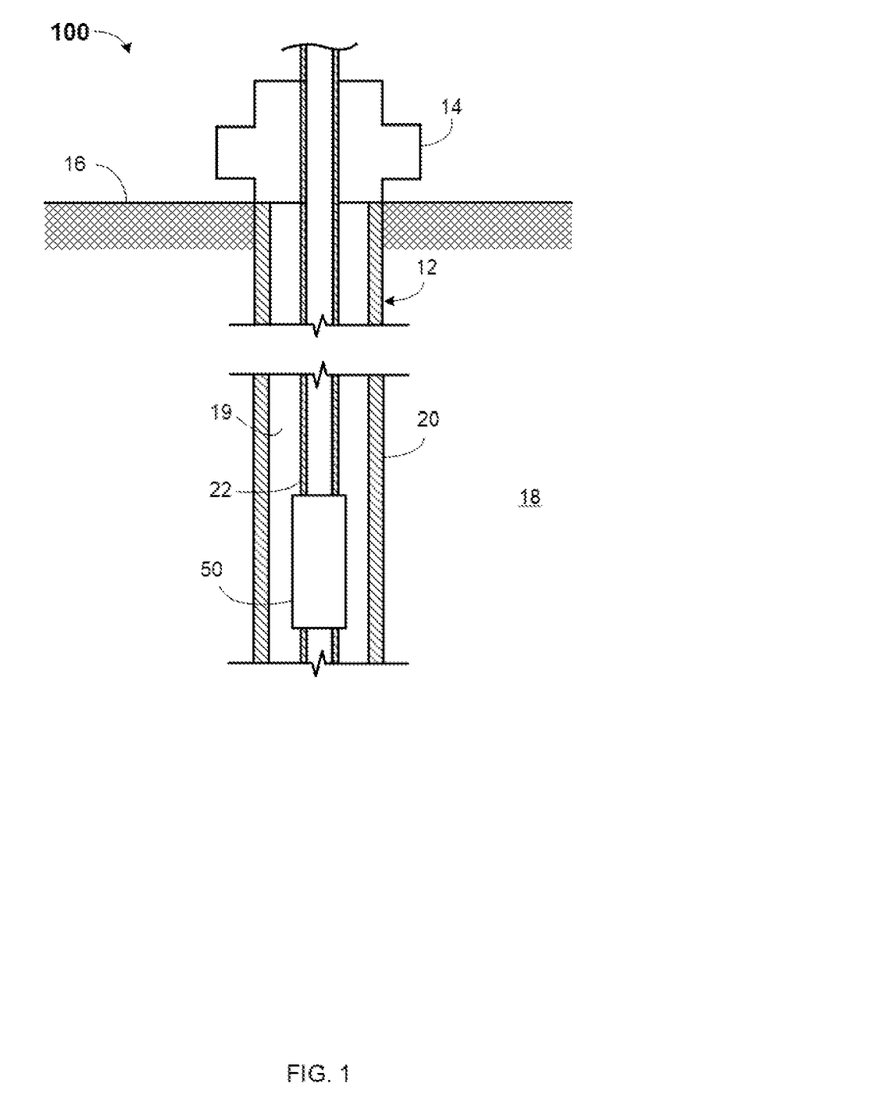
FIG. 1 depicts a schematic partially cross-sectional view of a well system, according to one or more embodiments.

FIG. 1 depicts a schematic partially cross-sectional view of a well system 100, according to one or more embodiments. The well system 100 includes a substantially cylindrical wellbore 12 extending from a wellhead 14 at the surface 16 downward into the Earth into a subterranean formation 18 (one zone is shown). The wellbore 12 extending from the wellhead 14 to the subterranean formation 18 is lined with lengths of tubing, called casing 20, to form a tubular located in the wellbore 12 and extending the length of the wellbore 12 or at least a portion thereof. The casing 20 can extend from the surface 16 and/or the wellhead 14 into the subterranean formation 18. Although one casing 20 is shown, the well system 100 may have multiple layers of casing radially disposed about casing 20. A well string 22 is shown as having been lowered from the surface 16 into the wellbore 12. The well string 22 is a series of jointed lengths of tubing coupled together end-to-end and/or a continuous (i.e., not jointed) coiled tubing (either referred to as a "tubular"). The well string 22 can extend from the wellhead 14 into the subterranean formation 18. An annulus 19 is formed between the well string 22 and the casing 20. Note, although shown as having casing 20, the wellbore 12 could be at least partially uncased, i.e., not having the casing 20, with the well string 22 disposed in the uncased portion of the wellbore 12. The depicted well system 100 is a vertical well, with the wellbore 12 extending substantially vertically from the surface 16 to the subterranean formation 18. The concepts herein, however, are applicable to many other different configurations of wells, including horizontal, slanted or otherwise deviated wells, and multilateral wells with legs deviating from an entry well. The well string can be a production string or completion string, depending on the use.

In one or more embodiments, the well string 22 includes one or more well tools 50 (one is shown). The one or more well tool 50 can include one or more downhole device, such as one or more valves, sleeves, baffles, electronics, sensors, etc., or a combination thereof. Although the well tool 50 is shown disposed on the well string 22, the tool sub could also be, or instead be, a part of the casing 20, i.e., a sub that screws into the casing 20, such as a type of frac sleeve or other sliding sleeve directly adjacent a sidewall of the wellbore 12 or cement disposed between the casing 20 and the wellbore 12. Although not depicted, one or more the system 100 could include one or more packers, e.g., disposed in the annulus 19 between the well string 22 and the casing 20 and/or between the well string 22 and the sidewall of the wellbore 12 (i.e., in an uncased portion of the wellbore 12).

Figure 2:
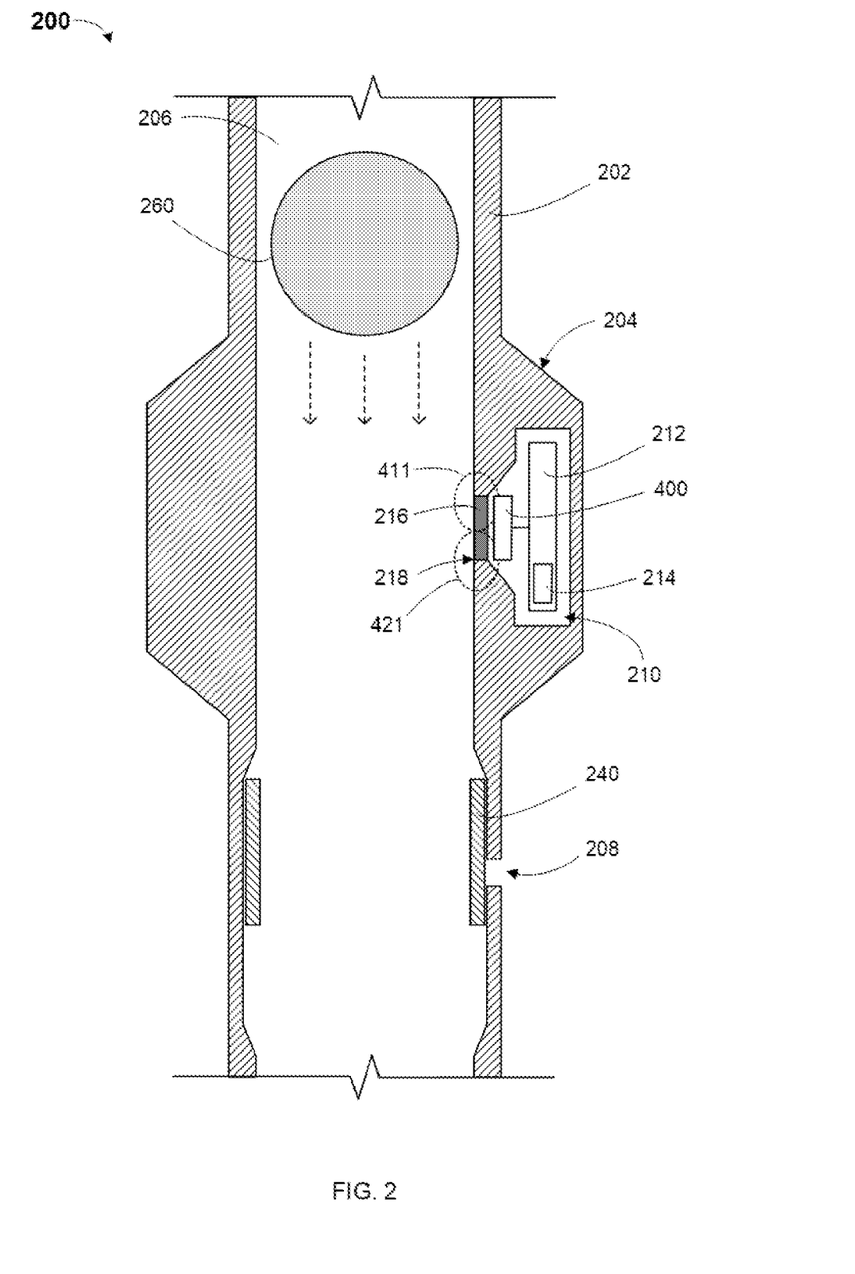
FIG. 2 depicts a schematic partially cross-sectional view of a first well tool having a magnetic sensor and a sliding sleeve, according to one or more embodiments.

FIG. 2 depicts a schematic partially cross-sectional view of a first well tool 200 having a sensor 400 and a sliding sleeve 240, according to one or more embodiments. In one or more embodiments, the first well tool 200 is a tool sub or injection valve, e.g., well tool 50 shown in FIG. 1, or a tool sub or injection valve connected to casing or in lieu of casing. In one or more embodiments, the first well tool 200 is an injection valve to selectively permit selectively permit fluid communication between an interior (e.g., a flowbore) of a tubular string, e.g., the well string 22, and one or more sections of the annulus 19 isolated between two of the packers. In one or more embodiments, the first well tool 200 is, contains, or is connected to a frac sleeve.

The first well tool 200 includes a sensor housing 204 connected to, i.e., joined to, a cylindrical sidewall 202. An inner bore 206 runs the length of the first well tool 200 and can be a flow passage connected to one or more tubulars that reach the wellhead 14. The sensor housing 204 houses the sensor 400, electronic circuit 212, and a battery 214 in a cavity 210. Note, although depicted with the battery 214, power could be supplied to the electronic circuit 212 from another power source, e.g., another downhole power source or power from the surface, instead of via a battery. Although one battery 214 is depicted, it should be understood that multiple batteries could be used in various configurations.

The sensor housing 204 has an opening 218 to the inner bore 206, where the opening 218 is filled with a plug 216. The plug 216 separates the sensor 400 from the inner bore 206 and can act as pressure barrier for the sensor 400. In one or more embodiments, the plug 216 has a relatively low magnetic permeability (e.g., having a relatively low tendency to support the formation of a magnetic field).

The sensor 400 can be a magnetic sensor. The sensor 400 is disposed close enough to the plug 216 (and therefore the opening 218) such that one or more magnetic field (a first magnetic field 411 and a second magnetic field 421 are shown) emanate from the sensor 400 into the inner bore 206. Although not shown, the plug 216 can have a cavity formed therein and the sensor 400 can be disposed at least partially in the cavity of the plug 216. The magnetic sensor can detect both a magnitude and a direction of the magnetic field. In one or more embodiments, the direction is at least one of a uphole and a downhole direction.

The plug 216 can be made of a nickel-chromium-based alloy, e.g., INCONEL®, or another material with low magnetic permeability (e.g., a magnetic permeability close to about $1 \times 10^{-6}$) and high strength (i.e., sufficient strength to withstand downhole pressures, vibration, and forces). In one or more embodiments, aluminum (e.g., having magnetic permeability of about 1.26×10-6), plastics, composites (e.g., with carbon fiber, etc.) and other nonmagnetic materials may also be used. In one or more embodiments, all, or most, of the sensor housing 204 could be made of a low magnetic permeability. For example, more than 50%, more than 60%, more than 70%, more than 80%, or more than 90% of the sensor housing 204 could be made of a low magnetic permeability.

The sensor 400 is electrically connected to the electronic circuit 212 and/or the battery 214. The sensor 400 is shown disposed between the plug 216 and the electronic circuit 212 and/or the battery 214; however, the electronic circuit 212 and/or the battery 214 can be disposed differently in the sensor housing 204. For example, the electronic circuit 212 and/or the battery 214 could be axially spaced above or below the sensor 400, e.g., to minimize the radial thickness of the sensor housing 204.

The electronic circuit 212 and/or the battery 214 can be electrically connected to the sliding sleeve 240 (or at least an actuator thereof). The sliding sleeve 240 can cover one or more flow ports 208 (one is shown) in the sidewall 202. Although only one sliding sleeve 240 is depicted, a plurality of sliding sleeves 240 can be included in first well tool 200 and/or connected to electronic circuit 212 and/or the battery 214.

Although not depicted, the first well tool 200 can include one or more actuators to move the sliding sleeve 240. The one or more actuators can be electrically connected to the electronic circuit 212. In one or more embodiments, the one or more actuators include one or more valves that move via a fluid, such as wellbore fluid, a hydraulic fluid, or the like. In one or more embodiments, the one or more actuators include a motor. In one or more embodiments, the one or more actuators include a piercing member that pierces a pressure barrier based on a signal sent from the electronic circuit 212.

Figure 3:
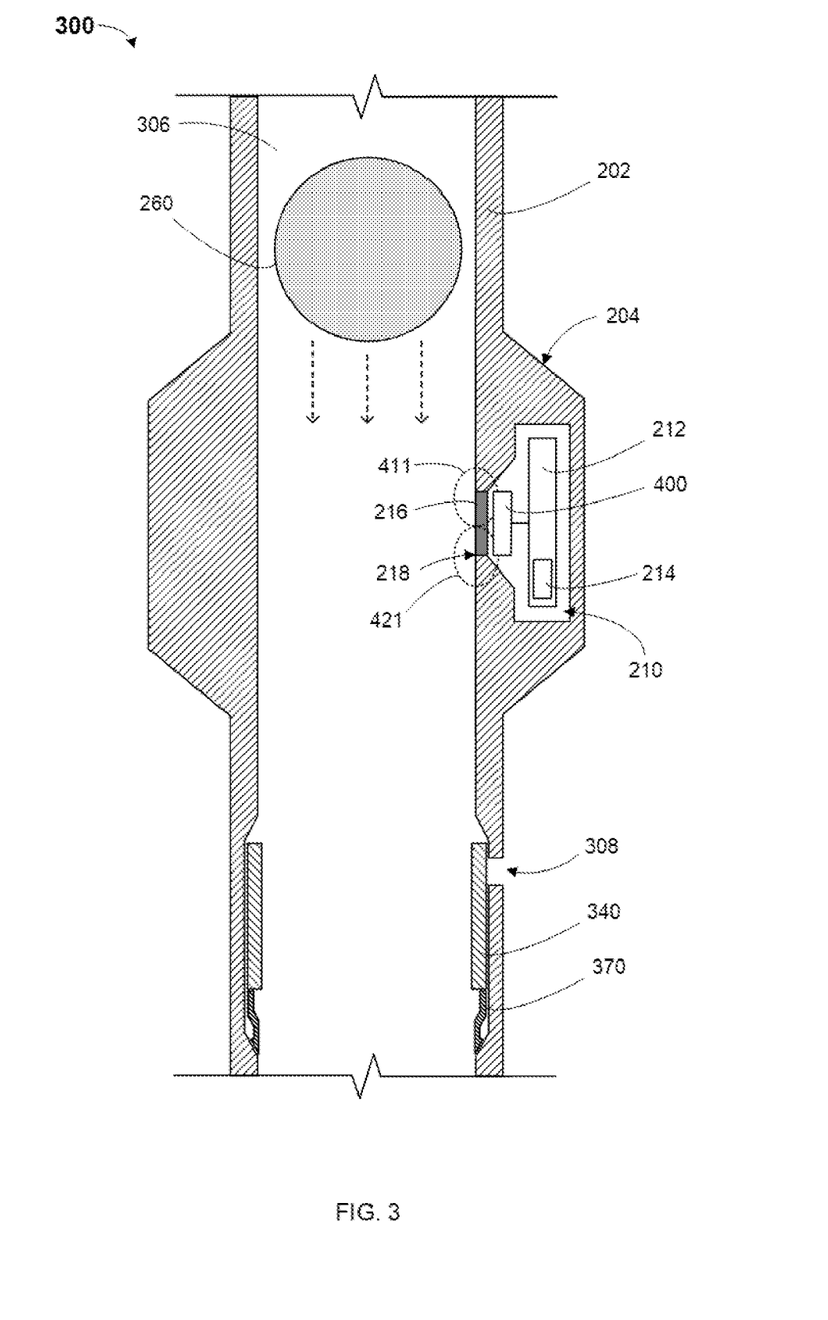
FIG. 3 depicts a schematic partially cross-sectional view of a second well tool having the magnetic sensor and a sliding sleeve with a baffle seat, according to one or more embodiments.

FIG. 3 depicts a cross-sectional view of a second well tool 300 having the sensor 400 and a sliding sleeve 340 with a baffle seat 370, according to one or more embodiments. In one or more embodiments, the second well tool 300 is a tool sub, e.g., well tool 50 shown in FIG. 1, or a tool sub or injection valve connected to casing or in lieu of casing. In one or more embodiments, the second well tool 300 is an injection valve to selectively permit selectively permit fluid communication between an interior (e.g., a flowbore) of a tubular string, e.g., the well string 22, one or more sections of the annulus 19 isolated between two of the packers. In one or more embodiments, the second well tool 300 is, contains, or is connected to a frac sleeve.

The second well tool 300 contains the same sensor housing 204 as the first well tool 200, connected to the cylindrical sidewall 202. Similarly, the second well tool 300 has an inner bore 306 that runs the length of the second well tool 300 and which can be a flow passage connected to one or more tubulars that reach the wellhead 14. As with the first well tool 200, the sensor housing 204 houses the sensor 400, the electronic circuit 212, and the battery 214 in the cavity 210. Similar to above, although depicted with the battery 214, power could be supplied to the electronic circuit 212 from another power source, e.g., another downhole power source or power from the surface, instead of via a battery.

Although one battery 214 is depicted, it should be understood that multiple batteries could be used in various configurations.

As described above, the sensor housing 204 in the second well tool 300 has an opening 218 to an inner bore 306, the opening 218 filled with the plug 216. As above, the plug 216 separates the sensor 400 from the inner bore 306 and can act as pressure barrier for the sensor 400. The plug 216 can be identical, in terms of materials and properties, as described for the first well tool 200.

Just as in the first well tool 200, the sensor 400 is electrically connected to the electronic circuit 212 and/or the battery 214. Likewise, the electronic circuit 212 and/or the battery 214 can be disposed as shown or can be disposed in a different manner, e.g., axially spaced above or below the sensor 400, e.g., to minimize the radial thickness of the sensor housing 204.

The electronic circuit 212 and/or the battery 214 can be electrically connected to the sliding sleeve 340 and/or the baffle seat 370 (or at least an actuator thereof, e.g. one of the one or mor actuators described above). The sliding sleeve 340 can cover one or more flow ports 308 until triggered to move. In the second well tool 300, the baffle seat 370 can be triggered to collapse, e.g., by a piston or other actuator, based on a signal sent from the electronic circuit 212. Note, while the baffle seat 370 is depicted functioning with the slide sleeve 340, the baffle seat 370 could be used differently, e.g., with one or more pistons or the like, but also triggered based a signal sent from the electronic circuit 212.

In operation, for both the first well tool 200 and the second well tool 300, the sensor 400 counts one or more magnetically permeable objects 260 that pass the sensor 400. (Further description of the sensor 400 and details of the counting process are provided below.) Although depicted as a ball or sphere, the one or more magnetically permeable objects 260 can have non-spherical forms such as a cylinder, a dart, bullet, slug, plug, or the like. In one or more embodiments, the one or more magnetically permeable objects 260 have a relative magnetic permeability greater than 1.1. For example, the one or more magnetically permeable objects 260 can be made of aluminum or steel. In one or more embodiments, the one or more magnetically permeably objects have a relative magnetic permeability greater than 2. For example, the one or more magnetically permeable objects 260 can be made of iron. In one or more embodiments, the one or more magnetically permeable objects 260 are composed of a first material and second material, wherein the first material has a relative magnetic permeability less than 2, and wherein the second material has a relative magnetic permeability greater than 3. For example, the one or more magnetically permeable objects 260 can be created from mixing iron powder with a polymer binder, from alloying iron into aluminum, from adding nuggets of a nickel alloy into a magnesium matrix, or the like. Mixing materials can result in the one or more magnetically permeably objects 260 having a total relative magnetic permeability of greater than 1.1 but less than 2, in some instances, or greater than 2, in other instances. In one or more embodiments, the one or more magnetically permeable objects 260 are dissolvable. In one or more embodiments, the one or more magnetically permeable objects 260 are not the source of a magnetic field, i.e., they do not contain magnets.

The one or more magnetically permeably objects 260 that pass the sensor 400 can be untethered objects, e.g., not suspended by a conveyance such as wireline, slickline, coiled tubing, drill pipe, or the like. In one or more embodiments, the one or more magnetically permeably objects 260 are dropped objects, e.g., objects dropped from the surface via the wellhead 14. In one or more embodiments, the one or more magnetically permeably objects 260 are pumped objects, e.g., objects pumped from the surface via the wellhead 14.

In the first well tool 200 depicted in FIG. 2, the sliding sleeve 240 can shift axially to open up the one or more flow ports 208 based on a signal sent from the electronic circuit 212 and/or the count of the one or more magnetically permeably objects 260. In one or more embodiments, after a particular count of the one or more magnetically permeably objects 260 that have passed the sensor 400, the sliding sleeve 240 can be actuated, e.g., via an actuator as described above, to uncover the one or more flow ports 208. For example, the sensor 400 can count the number of the magnetically permeably objects 260 that have passed the sensor 400 in a first direction and can store that count in the electronic circuit 212. In one or more embodiments, the electronic circuit 212 is configured to count one or more magnetically permeably objects 260 that have passed by the sensor 400. The electronic circuit 212 can be configured to trigger actuation of the sliding sleeve 240 based on the stored count.

In the second well tool 300 depicted in FIG. 3, based on a signal sent from the electronic circuit 212 and/or the count of the one or more magnetically permeably objects 260, the baffle seat 370 can collapse allowing the sliding sleeve 340 to shift axially to open up the one or more flow ports 308. In one or more embodiments, after a particular count of the one or more magnetically permeably objects 260 that have passed the sensor 400, the sliding sleeve 340 and/or the baffle seat 370 can be actuated, e.g., via an actuator as described above, to uncover the one or more flow ports 308. For example, the sensor 400 can indicate a certain count of magnetically permeably objects 260 have passed the sensor 400 in a first direction and can store that count in the circuitry. The circuitry can be configured to trigger actuation of the sliding sleeve 340 and/or the baffle seat 370 based on the stored count.

Note, while embodiments are depicted with a sliding sleeve and a baffle seat, other downhole devices, such as one or more valves, sensors, packers, or the like, can be triggered via the sensor 400 and the electronic circuit 212 based on a count or a count and direction of the one or more magnetically permeably objects 260 that have passed the sensor 400. In at least one embodiment, when the count reaches a predetermined amount, the count adjusting for direction of the one or more magnetically permeably objects 260, the well tool can activate to initiate hydraulic fracturing.

Figure 4:
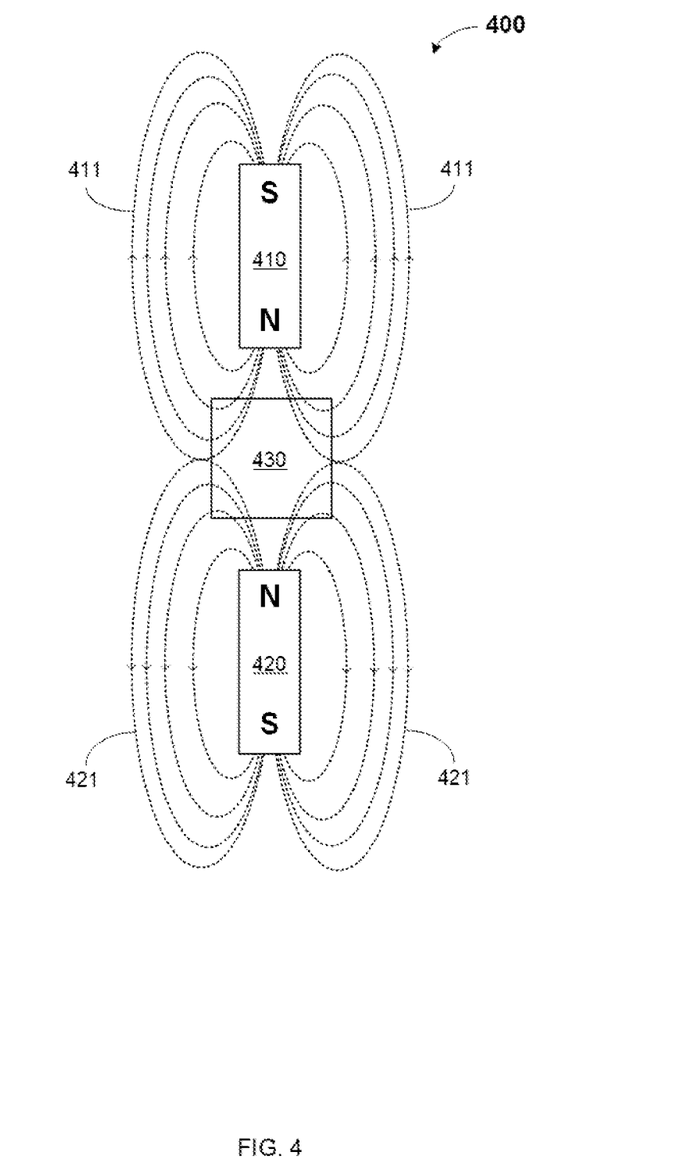
FIG. 4 depicts schematic view of the magnetic sensor, according to one or more embodiments.

FIG. 4 depicts schematic view of the sensor 400, according to one or more embodiments. The sensor 400 has three main components: a first permanent magnet 410, a second permanent magnet 420, and a magnetic field sensor 430. The first permanent magnet 410 and the second permanent magnet 420 are disposed to have opposite polarity, i.e., either the north (N) pole of the first permanent magnet 410 faces the N pole of the second permanent magnet 420 (as shown) or the south (S) pole of the first permanent magnet 410 faces the S pole of the second permanent magnet 420. Each of the permanent magnets produce a magnetic field, represented by dashed elliptical lines running from the N pole to the S pole of each of the magnets. As depicted, the first permanent magnet 410 has a first magnetic field 411 emanating therefrom, and the second permanent magnet 420 has a second magnetic field 421 emanating therefrom. The first magnetic field 411 is opposed to the second magnetic field 421.

The magnetic field sensor 430 is disposed between the like poles of the first permanent magnet 410 and the second permanent magnet 420. The magnetic field sensor 430 is positioned between the first permanent magnet 410 and the second permanent magnet 420 to measure one or more changes to the magnetic field. With the opposing magnetic fields 411 and 421 from the first permanent magnet 410 and the second permanent magnet 420, respectively, the magnetic flux through the magnetic field sensor 430 is balanced.

Figure 5:
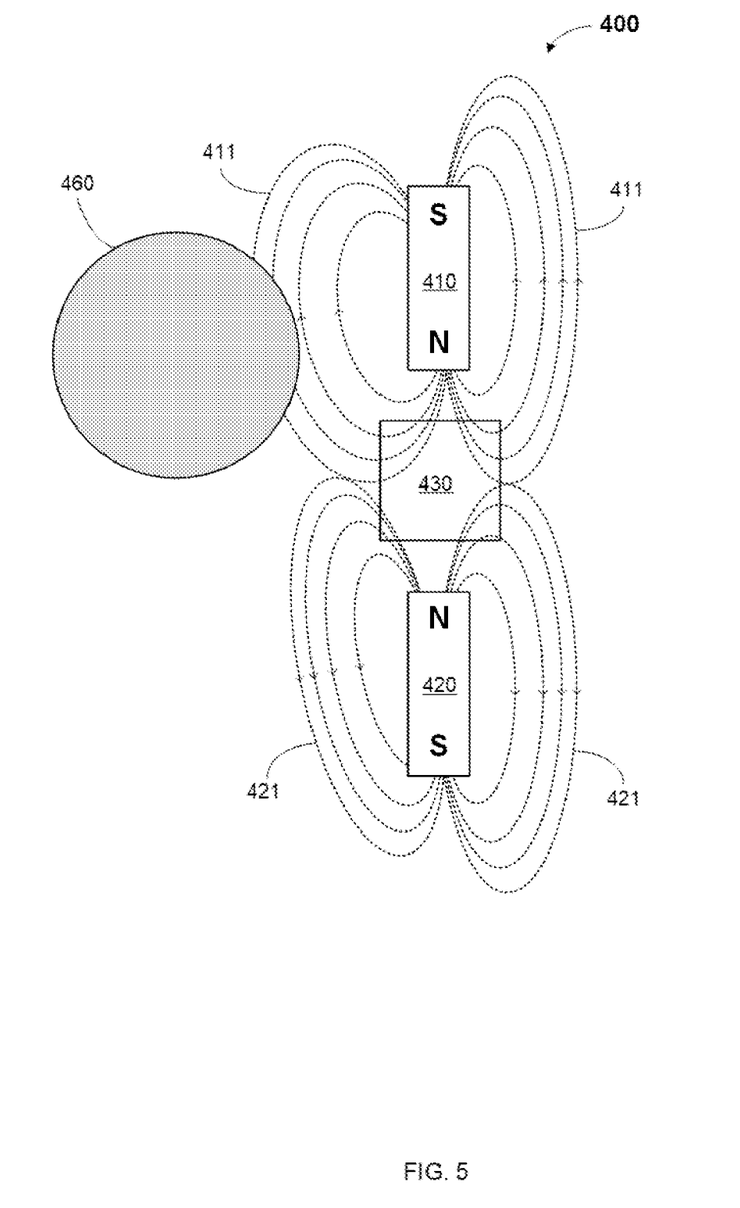
FIG. 5 depicts schematic view of a magnetically permeable object nearing the magnetic sensor, according to one or more embodiments.

FIG. 5 depicts schematic view of a magnetically permeable object 460 nearing the sensor 400, according to one or more embodiments. The magnetically permeable object 460 can be the same or similar to the magnetically permeable object 260 described above.

As the magnetically permeable object 460 approaches the first magnetic field 411 of the first permanent magnet 410, the first magnetic field 411 shifts towards, i.e., moves closer to, the magnetically permeable object 460 thus changing the amount of magnetic field through the magnetic field sensor 430. Likewise, the second magnetic field 421 also shifts towards, i.e., moves closer, the magnetically permeable object 460, but angled differently from the first magnetic field 411, as shown. This shift in the first magnetic field 411 and the second magnetic field 421 is measured by the magnetic field sensor 430 because the shift changes the amount of magnetic field through the magnetic field sensor 430. As the magnetically permeable object 460 centers over the magnetic field sensor 430 (not shown), the magnetic flux will become balanced again, which will also be measured the magnetic field sensor 430. The signal strength of the sensor 400 can depend on the magnetic permeability of the magnetically permeable object 460, the distance of the magnetically permeable object 460 from the sensor 400, the strength of the first magnetic field 411 and the second magnetic field 421, and the sensitivity of the magnetic field sensor 430. The strength, i.e., distance and magnitude, of each of the first magnetic field 411 and the second magnetic field 421 is a factor of the size of the first permanent magnet 410 and the second permanent magnet 420.

Figure 6:
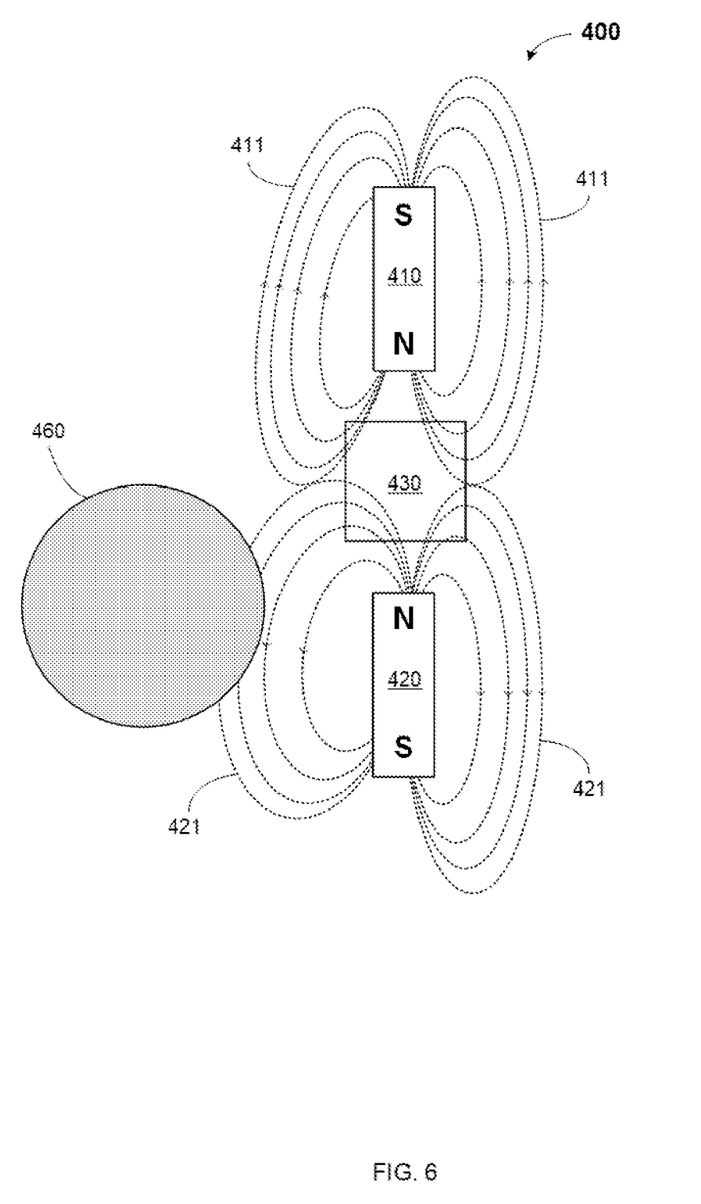
FIG. 6 depicts schematic view of a magnetically permeable object moving past the magnetic sensor, according to one or more embodiments.

FIG. 6 depicts schematic view of a magnetically permeable object 460 moving past the sensor 400, according to one or more embodiments. As the magnetically permeable object 460 passes by the magnetic field sensor 430 and moves closer to the second permanent magnet 420, the first magnetic field 411 and the second magnetic field 421 both shift to follow the magnetically permeable object 460, as shown. This continuous shift or change in the first magnetic field 411 and the second magnetic field 421 is measured by the magnetic field sensor 430. In one or more embodiments, circuitry (e.g., circuit 212) is configured to count one or more magnetically permeably objects 460 that have passed by the magnetic field sensor 430, e.g., based on the change to the first magnetic field 411 and/or the second magnetic field 421 as measured by the magnetic field sensor 430.

The magnetic field sensor 430 outputs a voltage or a current based on its measured change to the first magnetic field 411 and the second magnetic field 421. Based on the output of the magnetic field sensor 430, circuitry (e.g., circuit 212) can determine, e.g., output, a direction of the one or more magnetically permeably objects 460. In one or more embodiments, the output for the one or more magnetically permeably objects 460 traveling in a first direction is distinctive from the output for the one or more magnetically permeably objects 460 traveling in a second direction thereby allowing a circuit and/or program code to quickly determine the direction the one or more magnetically permeably objects 460.

In one or more embodiments, the magnetic field sensor 430 is an inductive coil, i.e., an inductive sensor, where changes in the magnetic field through the coil generate an electromotive force (emf) voltage in the coil. For example, when the measured magnetic field shifts towards the magnetically permeable object 460 approaching the first permanent magnet 410 in a first direction, e.g., a direction axially pointed away from the wellhead 14 along the tubular, this first shift can generated a positive voltage. Then, as the measured magnetic field shifts to follow the magnetically permeable object 460 approaching the second permanent magnet 420 and then passing it, this second shift can generate a swing to a negative voltage.

Note, however, if the magnetically permeable object 460 is travelling in the opposite direction, i.e., a second direction, from what is shown in FIGS. 5-6, e.g., traveling towards the wellhead 14 instead of away from it, as can occur when fluids or pressure push and/or float the object back up the tubular towards the wellbore, the effect on the voltage output of the magnetic field sensor 430 can be reversed. For example, when the measured magnetic field shifts towards the magnetically permeable object 460 approaching the second permanent magnet 420 in the opposite or second direction, e.g., a direction axially pointed toward the wellhead 14 along the tubular, this shift downward, i.e., a shift away from the wellhead, can generated a negative voltage. Then, as the measured magnetic field shifts to follow the magnetically permeable object 460 approaching the first permanent magnet 410 and then passing it, this second shift can generate a swing to a positive voltage.

Figure 7A:
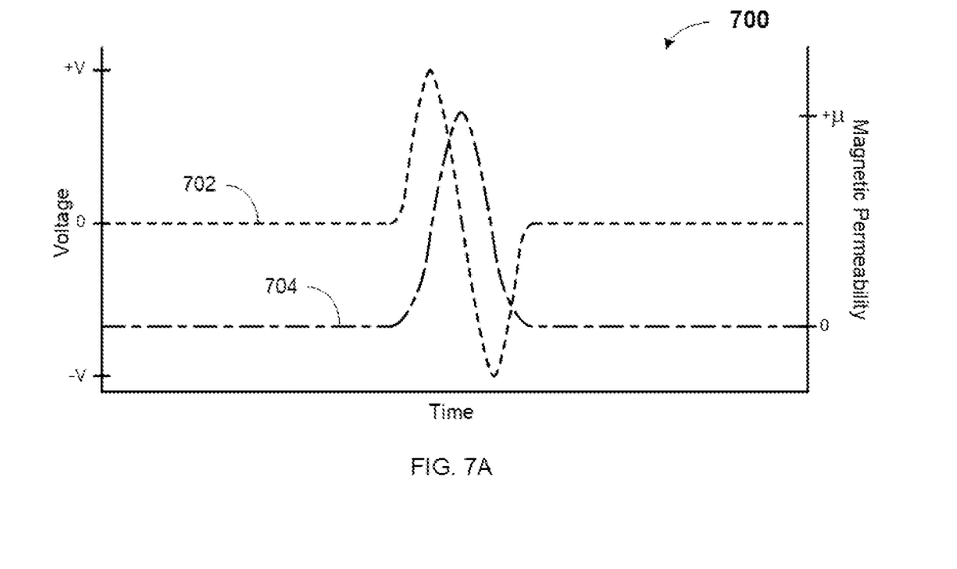
FIG. 7A depicts a first graph of measured magnetic permeability by the magnetic field sensor and a voltage output thereof with the magnetically permeable object 460 traveling in a first direction, according to one or more embodiments.

FIG. 7A depicts a first graph 700 of measured magnitude of the magnetic permeability by the magnetic field sensor 430 and a voltage output thereof with the magnetically permeable object 460 traveling in a first direction, according to one or more embodiments. In one or more embodiments, the magnetically permeable object 460 is traveling in the first direction, e.g., downhole, i.e., away from the wellhead 14. The first graph 700 overlays an example voltage output 702 from the magnetic field sensor 430 with an example measured magnitude of the magnetic permeability 704 by the magnetic field sensor 430 with the magnetically permeable object 460 traveling in the first direction.

With the magnetically permeable object 460 traveling in the first direction, as the measured magnitude of the magnetic permeability 704 increases from zero to a positive magnetic permeability (shown as "+μ" on the left y-axis) over time, the voltage output 702 can increase to a positive voltage (shown as "+V"), e.g., the voltage can remain positive with a positive increase of magnetic permeability. Likewise, as the measured magnitude of the magnetic permeability 704 decreases from a positive magnetic permeability to zero, the voltage output 702 can decrease to a negative voltage (shown as "−V"), e.g., the voltage can remain negative with a negative increase of magnetic permeability. As shown, due to the magnetically permeable object 460 traveling in the first direction, the voltage output 702 increases while the slope of the magnetic permeability 704 increases, and the voltage output 702 decreases while the slope of the magnetic permeability 704 decreases. In or more embodiments, the increasing magnitude of the magnetic permeability corresponds to the magnetically permeable object 460 approaching the center of the magnetic field sensor 430 in the first direction, e.g., a direction axially pointed away from the wellhead 14 along the tubular, and the decreasing magnetic permeability corresponds to the magnetically permeable object 460 traveling away from the center of the magnetic field sensor 430, still in the first direction.

Figure 7B:
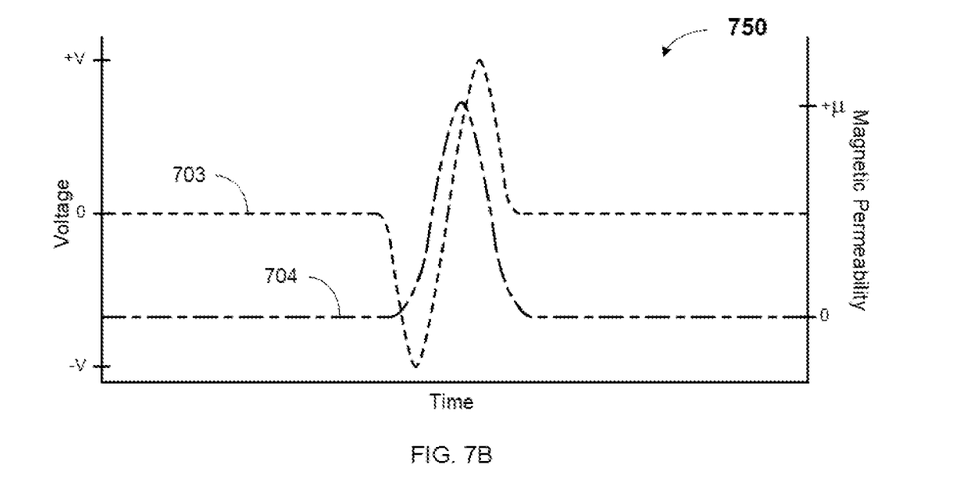
FIG. 7B depicts a second graph of measured magnetic permeability by the magnetic field sensor and a voltage output thereof with the magnetically permeable object traveling in a second direction, according to one or more embodiments.

FIG. 7B depicts a second graph 750 of measured magnitude of the magnetic permeability by the magnetic field sensor 430 and a voltage output 703 thereof with the magnetically permeable object 460 traveling in a second direction, according to one or more embodiments. In one or more embodiments, the magnetically permeable object 460 travels in the second direction, i.e., an opposite direction than shown in first graph 700 of FIG. 7A. The second graph 750 overlays an example voltage output 703 from the magnetic field sensor 430 with an example measured magnitude of the magnetic permeability 704 by the magnetic field sensor 430 with the magnetically permeable object 460 traveling in the second direction.

As depicted, the measured magnitude of the magnetic permeability 704 has the same response (as the permeability alone is not sensitive to direction in this case), but the voltage output 703 differs from the voltage output in the first graph 700 due to the change in direction. Because the magnetically permeable object 460 is traveling in the second direction, the voltage output 703 is opposite of that of the voltage output 702 depicted in the first graph 700. Specifically, with the magnetically permeable object 460 traveling in the second direction, as the measured magnitude of the magnetic permeability 704 increases from zero to a positive magnetic permeability over time, the generated voltage output 703 decreases to a negative voltage. Likewise, as the measured magnitude of the magnetic permeability 704 decreases from a positive magnetic permeability to zero, the generated voltage output 703 increases to a negative voltage.

Figure 8:
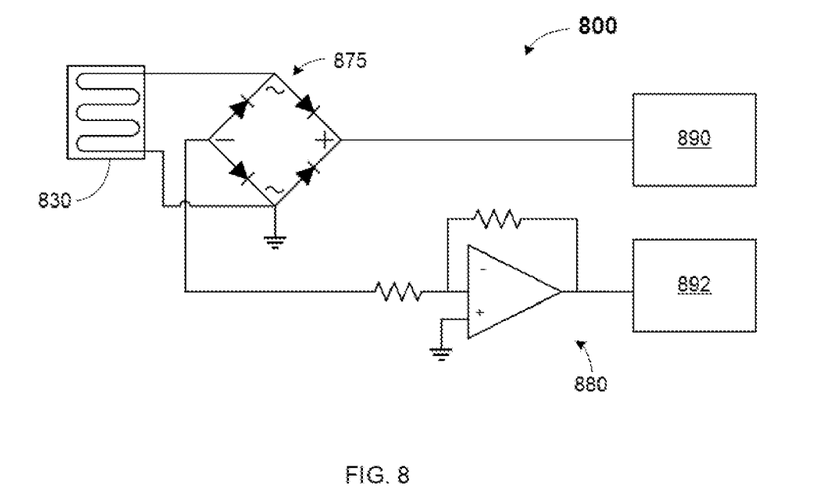
FIG. 8 depicts an example peak detection circuit, according to one or more embodiments.

FIG. 8 depicts an example peak detection circuit 800, according to one or more embodiments. In one or more embodiments, the peak detection circuit 800 can be used to sense the positive and negative voltages output from magnetic field sensor 830 by identifying the positive and negative peaks. From the detected peaks, the direction of the magnetically permeable object 460 can be determined.

In the peak detection circuit 800, outputs of an induction coil magnetic field sensor 830 are connected to the alternating inputs of a voltage rectifier 875. Although not depicted as such, in one or more embodiments the voltage rectifier 875 could be included with the coils to form a single magnetic field sensor. A first output of the voltage rectifier 875 on the positive side of the voltage rectifier 875 connects, i.e. is coupled, to a first peak detection circuit 890 to detect the positive voltage from the induction coil magnetic field sensor 830. A second output of the voltage rectifier 875 on the negative side of the voltage rectifier 875 is coupled to an inverting op-amp 880. The second output passes the negative voltage of the voltage rectifier 875 to the inverting op-amp 880 with unity gain. The output of the inverting op-amp 880 is then connected to a second peak detection circuit 892 to detect the negative voltage from the induction coil magnetic field sensor 830. Note, while the above describes negative and positive peak detection, the circuit could be modified so the peak detection is high and low peak detection, e.g., when a DC offset is applied.

The first peak detection circuit 890 and the second peak detection circuit 892 can then be used to determine whether a negative voltage or a positive voltage came first. Based which peak came first, the direction of the magnetically permeable object 460 passing the single magnetic field sensor 430 can be determined. For example, a positive peak occurring before a negative peak can indicate the magnetically permeable object 460 is traveling downhole, i.e., away from the wellhead 14, and a negative peak occurring before a positive peak can indicate the magnetically permeable object 460 is traveling uphole, i.e., toward the wellhead 14.

The above circuit is provided as one way to determine direction based on the output from the induction coil magnetic field sensor 830; note, however, that other circuitry could be used such as an op-amp having positive and negative supply, logic gates, or the like. Further, a processor or other logic could be used instead of peak detection. Using peak detection circuits can allow for a lower power system because the detection is analog. However, it would be also be possible to use a digital system, e.g., sampling the signal from the magnetic field sensor (either the induction coil magnetic field sensor 830 or another type of magnetic field sensor).

Figure 9:
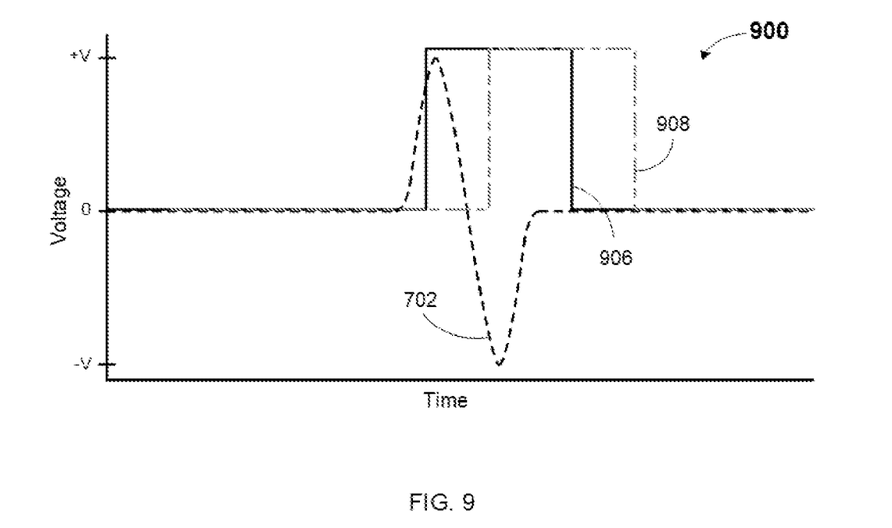
FIG. 9 depicts a graph of peak detection of voltage output of the magnetic field sensor, according to one or more embodiments.

FIG. 9 depicts a graph 900 of peak detection of voltage output of the magnetic field sensor 830, according to one or more embodiments. In graph 900, the voltage output 702 from FIG. 7A is overlayed with a first output 906 of the first peak detection circuit 890 and a second output 908 of the second peak detection circuit 892. As can be seen, the voltage output 702 goes positive first and then goes negative second. As such, the first output 906 is earlier in time than the second output 908. As voltage output 702 is the result of the magnetically permeable object 460 going downhole, i.e., away from the wellhead 14 along the tubular, this timing output from the first peak detection circuit 890 and the second peak detection circuit 892 can be used to signal a direction of the magnetically permeable object 460. Although not shown, the order of the first output 906 and the second output 908 would be reversed if applied to the voltage output 703 in the second graph 750 in FIG. 7B, as the voltage output 703 goes negative first and positive second. As such, by understanding the output of the induction coil magnetic field sensor 830 a circuit design can be easily implemented to determine direction of the magnetically permeable object 460.

Note, while the circuit(s) and outputs described above with respect to FIGS. 7-9 relate to the induction coil magnetic field sensor 830, similar principles can be applied to other types of the magnetic field sensors generally. Referring again to FIGS. 4-6, the magnetic field sensor 430 could also be a giant magnetoresistance (GMR) sensor, a Hall effect sensor, a MEMs Lorentz force sensor, or any other device that can measure magnetic fields, flux, or permeability and be disposed downhole. The outputs of each of these types of sensors may vary, but each, coupled with the first permanent magnet 410 and the second permanent magnet 420, can be sensitive to direction of the magnetically permeable object 460 moving past it.

For example, in one or more embodiments, the magnetic field sensor 430 is a GMR sensor where the output is a resistance that reflects changes to the measured magnetic field. By putting a voltage on the output, a voltage divider can be created such that increased resistance equates to increased voltage and decreased resistance equate to decreased voltage. The voltage levels and/or slope can then be used, e.g., using a peak detection circuit, a processor, or the like, to determine the direction.

In one or more embodiments, the magnetic field sensor 430 is a Hall effect sensor that outputs a voltage. For example, the Hall effect sensor could output a low voltage when the magnetically permeable object 460 is moving in a first direction, e.g., the downhole direction, and can output a high voltage when the magnetically permeable object 460 is moving in a second direction, e.g., the uphole direction. The low voltage could be 0 volts, half the input voltage, or the like, depending on whether a negative voltage supply is included in the system. A peak detection circuit could be applied to the output to detect the timing of the low voltage versus the high voltage, and thereby determined direction of the magnetically permeable object 460.

In one or more embodiments, the magnetic field sensor 430 is a MEMs Lorentz force sensor that outputs a voltage based on a measured change in the Lorentz force. Similar to the above, the pattern of the voltage output can be used to determine the direction of the magnetically permeable object 460, e.g., using a peak detection circuit or other logic. Indeed, other types of magnetic field sensor or magnetometers can be used to detect the magnitude and direction of the magnetic field, and the principles above can be applied to use a distinctive pattern of the output to determine direction of the magnetically permeable object 460.

Figure 10:
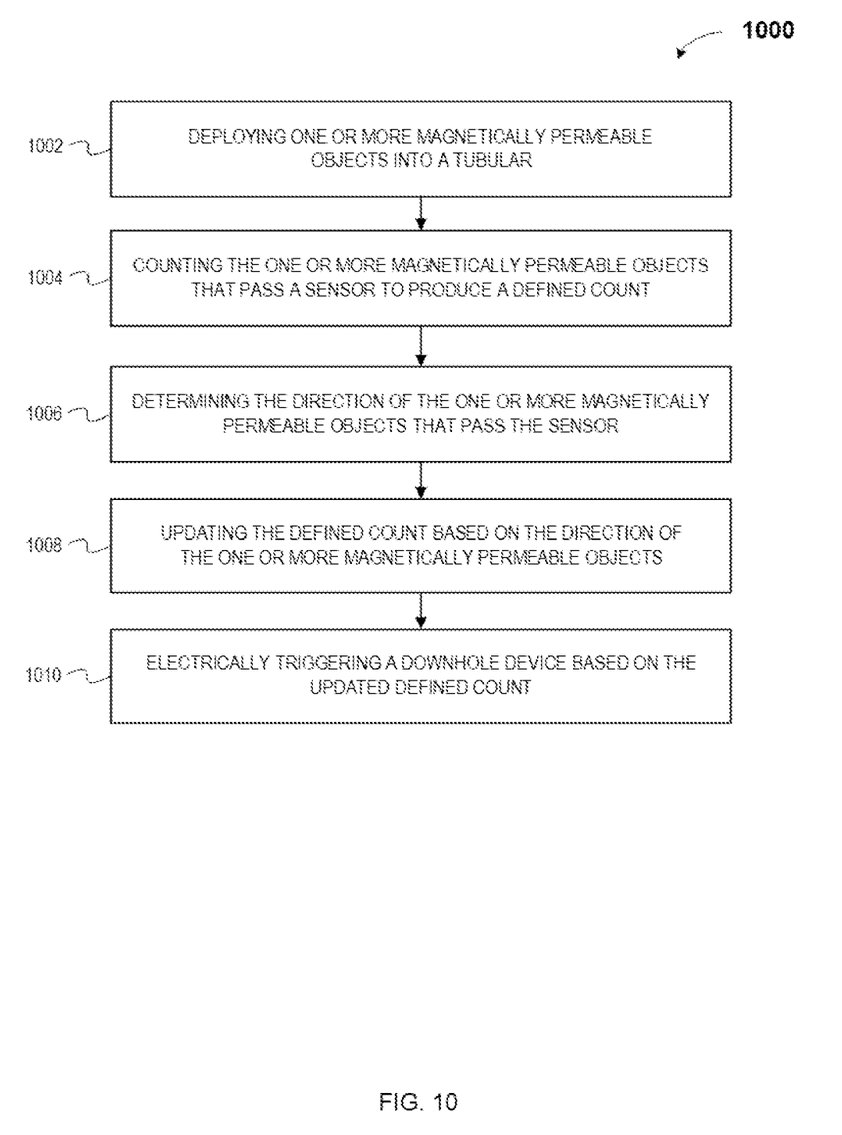
FIG. 10 depicts a flowchart of a method for counting the number of magnetically permeable objects passing a single magnetic sensor in a first direction, according to one or more embodiments.

FIG. 10 depicts a flowchart of a method 1000 for counting the number of magnetically permeable objects passing a single magnetic sensor in a first direction, according to one or more embodiments. The single magnetic sensor can be the sensor 400 described above. The first direction can be downhole, i.e., away from the surface and towards a toe of the tubular. However, there could be instances to instead count magnetically permeable objects passing the magnetic sensor in the opposite direction, i.e., either direction is possible with the sensor 400.

At 1002, one or more magnetically permeable objects (e.g., the magnetically permeable object 260 or the magnetically permeable object 460 described above) is deployed into a tubular (e.g., the well string 22, the casing 20, or another downhole tubular) that has been disposed in a wellbore (e.g., wellbore 12). In one or more embodiments, one or more magnetically permeable objects are untethered object, e.g., the whole object moves downhole without connection to the surface or another point in the wellbore. For example, the untethered object can be an object capable of being deployed downhole without a line (e.g., a wireline, slickline, wire, or coiled tubing) attached thereto. Deploying a the one or more magnetically permeable objects can include dropping the one or more magnetically permeable objects in the tubular, i.e., allowing gravity and momentum to carry the object downhole, or can include pumping the one or more magnetically permeable objects downhole, e.g., in non-vertical wells or wells where pressure might impede the travel path of the one or more magnetically permeable objects to their desired destination.

At 1004, the one or more magnetically permeable objects that pass a sensor is counted to produce a defined count. As described above, the sensor can be a magnetic sensor (e.g. the sensor 400). The defined count can be stored in circuitry and/or memory in electronics coupled to the sensor (e.g., electronics 212).

At 1006, the direction of the one or more magnetically permeable objects that pass the sensor is determined. As described above, the direction of the one or more magnetically permeable objects that pass the sensor can be based on measuring one or more changes to the magnetic field sensed by a magnetic field sensor (e.g., magnetic field sensor 430), where the magnetic field is produced by two permanent magnets (e.g., the first permanent magnet 410 and the second permanent magnet 420), and where the magnetic field sensor is disposed between opposing poles of the two permanent magnets.

Based on the determined direction, at 1008, the defined count can be updated. In one or more embodiments, the defined count increments when a magnetically permeable object passes the sensor going in the first direction, e.g., downhole, and decrements when a magnetically permeable object passes the sensor going in a second direction. This can be helpful if a magnetically permeable object flows back uphole past the sensor and then is forced back down the hole past the same sensor. Without decrementing the defined count, this magnetically permeable object would be counted three times, down the first time, up the first time, and then down past the sensor a second time. In other embodiments, the defined count only increments when a magnetically permeable object passes the sensor going in the first direction, but does not increment when a magnetically permeable object passes the sensor going in the second direction, i.e., instead of decrementing the count, the magnetically permeable object passing in the second direction is ignored. For example, in certain situations a magnetically permeable object may be dropped or pumped downhole, but may come back up the tubular, e.g., due to pressure, produced fluid, or the like. By decrementing the count, or just not incrementing the count, based on the magnetically permeable object passing the sensor while traveling uphole, i.e., the second direction, the accuracy of the desired count can be preserved.

Based on the updated defined count, at 1010, a downhole device can be an electrically triggered device. In one or more embodiments, circuitry in, or coupled to, the sensor is configured to send a signal to one or more downhole devices, e.g. an electrically triggered device, based on the defined count and/or the updated count. For example, a downhole system can contain a downhole device that triggers at a defined count from the sensor, i.e., once the defined count is reached, the device can trigger. By the sensor being able to account for direction, in at least one embodiment, a downhole device is not electrically triggered by one or more magnetically permeable objects travelling in the wrong direction, e.g., by a "false count" where a one or more magnetically permeable objects is counted two or more times.

FIG. 10 is annotated with a series of numbers 1002 to 1010. These numbers represent stages of operations. Although these stages are ordered for this example, the stages illustrate one example to aid in understanding this disclosure and should not be used to limit the claims. Subject matter falling within the scope of the claims can vary with respect to the order and some of the operations.

The flowchart is provided to aid in understanding the illustrations and is not to be used to limit scope of the claims. The flowchart depicts example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code or circuitry, e.g., located in downhole electronics. If in program code, the program code may be provided to a processor of a general-purpose computer, special purpose computer, or other programmable machine or apparatus.

As will be appreciated, aspects of the disclosure may be embodied as a system, method, or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store, a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for storing a count of the magnetic permeable objects that have passed the sensor, as described herein, may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally from the formation toward the surface, e.g., toward wellhead 14 in FIG. 1, or toward the surface of a body of water; likewise, use of "down," "lower," "downward," "down-hole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. An apparatus comprising:
    a first permanent magnet;
    a second permanent magnet;
    a magnetic field sensor disposed between opposing poles of the first permanent magnet and the second permanent magnet, wherein the first permanent magnet and the second permanent magnet each produce a magnetic field; and
    a circuit connected to the magnetic field sensor, the circuit configured to:
        count one or more magnetically permeable objects that have passed by the magnetic field sensor to produce a defined count of the one or more magnetically permeable objects,
        measure, via the magnetic field sensor, one or more changes in the magnetic field of at least one of the permanent magnets as one or more magnetically permeable objects passes by the magnetic field sensor,
        generate, via the magnetic field sensor, a voltage output based on the one or more changes, the voltage output including a positive voltage peak and a negative voltage peak,
        determine a direction of the one or more magnetically permeable objects based on a sequence of the positive voltage peak and the negative voltage peak, and
        update the defined count based on the direction of the one or more magnetically permeable objects that have passed by the magnetic field sensor, wherein the defined count will be increased with a first sequence of the positive voltage peak and the negative voltage peak, and wherein the defined count will remain unchanged or decremented with a second sequence of the positive voltage peak and the negative voltage peak, wherein the circuit is further configured to send a signal to an electrically triggered device based on the updated defined count.

2. The apparatus of claim 1, wherein the magnetic field sensor is a coil.

3. The apparatus of claim 1, wherein the circuit comprises:
- a voltage rectifier having a first output and a second output;
- a first peak detection circuit coupled to the first output;
- an inverting op-amp coupled to the second output; and
- a second peak detection circuit coupled to an output of the inverting op-amp.

4. The apparatus of claim 1, wherein the one or more magnetically permeable objects are untethered objects.

5. The apparatus of claim 1, wherein the one or more magnetically permeable objects have a relative magnetic permeability greater than 2.

6. The apparatus of claim 1, wherein the one or more magnetically permeable objects are composed of a first material and second material, wherein the first material has a relative magnetic permeability less than 2, and wherein the second material has a relative magnetic permeability greater than 3.

7. The apparatus of claim 1, wherein the first sequence indicates one or more magnetically permeable objects are traveling away from a wellhead and wherein the second sequence indicates one or more magnetically permeable objects are traveling towards a wellhead.

8. A method comprising:
- deploying one or more magnetically permeable objects into a tubular, wherein the tubular is disposed in a wellbore;
- counting the one or more magnetically permeable objects that pass a sensor to produce a defined count, the sensor comprising:
  - a first permanent magnet,
  - a second permanent magnet, and
  - a magnetic field sensor disposed between opposing poles of the first permanent magnet and the second permanent magnet, wherein the first permanent magnet and the second permanent magnet each produce a magnetic field;
- measuring, via the magnetic field sensor, one or more changes in the magnetic field of at least one of the permanent magnets as one or more magnetically permeable objects passes by the magnetic field sensor;
- generating, via the magnetic field sensor, a voltage output based on the one or more changes, the voltage output including a positive voltage peak and a negative voltage peak;
- determining a direction of the one or more magnetically permeable objects that pass the sensor based a sequence of the positive voltage peak and the negative voltage peak;
- updating the defined count based on the direction of the one or more magnetically permeable objects, wherein the defined count will be increased with a first sequence of the positive voltage peak and the negative voltage peak, and wherein the defined count will remain unchanged or decremented with a second sequence of the positive voltage peak and the negative voltage peak; and
- electrically triggering a downhole device based on the updated defined count.

9. The method of claim 8, wherein the tubular extends from a wellhead into a subterranean formation; and
wherein determining the direction of the one or more magnetically permeable objects that pass the sensor comprises determining, for each of the one or more magnetically permeable objects that pass the sensor, whether the magnetically permeable object is traveling away from the wellhead or towards the wellhead.

10. A system comprising:
- a downhole tubular having a sidewall joining a sensor housing;
- a magnetic sensor disposed within the sensor housing, the magnetic sensor comprising:
  - a first permanent magnet;
  - a second permanent magnet;
  - a magnetic field sensor disposed between opposing poles of the first permanent magnet and the second permanent magnet, wherein the first permanent magnet and the second permanent magnet each produce a magnetic field; and
- a circuit connected to the magnetic field sensor, the circuit configured to:
  - count one or more magnetically permeable objects that have passed by the magnetic field sensor to produce a defined count of the one or more magnetically permeable objects,
  - measure, via the magnetic field sensor, one or more changes in the magnetic field of at least one of the permanent as one or more magnetically permeable objects passes by the magnetic field sensor,
  - generate, via the magnetic field sensor, a voltage output based on the one or more changes, the voltage output including a positive voltage peak and a negative voltage peak,
  - determine direction of the one or more magnetically permeable objects based on a sequence of the positive voltage peak and the negative voltage peak,
  - update the defined count based on the direction of the one or more magnetically permeable objects that have passed the magnetic field sensor, wherein the defined count will be increased with a first sequence of the positive voltage peak and the negative voltage peak, and wherein the defined count will remain unchanged or decremented with a second sequence of the positive voltage peak and the negative voltage peak; and
- an electrically triggered device coupled to the magnetic field sensor wherein the circuit is further configured to send a signal to the electrically triggered device based on the updated defined count.

11. The system of claim 10, wherein the electrically triggered device is one of a baffle seat or a sliding sleeve covering a flow port.

12. The system of claim 10, wherein the one or more magnetically permeable objects have a relative magnetic permeability greater than 2.

13. The system of claim 10, wherein the one or more magnetically permeable objects are composed of a first material and second material, wherein the first material has a relative magnetic permeability less than 2, and wherein the second material has a relative magnetic permeability greater than 3.

* * * * *